Dec. 24, 1929. C. H. STEDTFELD Re. 17,535

WINDSHIELD CLEANER

Original Filed Jan. 18, 1927

INVENTOR
CHRISTIAN H. STEDTFELD
By Paul, Paul & Woods
ATTORNEYS

Reissued Dec. 24, 1929 Re. 17,535

UNITED STATES PATENT OFFICE

CHRISTIAN H. STEDTFELD, OF BRAINERD, MINNESOTA

WINDSHIELD CLEANER

Original No. 1,669,680, dated May 15, 1928, Serial No. 161,804, filed January 18, 1927. Application for reissue filed October 19, 1928. Serial No. 313,601.

This invention relates to windshield cleaners, and has for one of its objects to provide a novel and simple apparatus through the medium of which a material, which is soluble in the presence of snow and ice and which will melt the same may be readily applied to the outer surface of a windshield so as to prevent snow and ice from accumulating thereon in a manner to obstruct the vision of the driver.

A further object of the invention is to provide an apparatus of the character stated which shall be adapted to be connected to the windshield wiper so as to permit the application of the soluble material during the operation of the wiper.

With the foregoing and other objects in view, the nature of which will be come apparent as the description proceeds, the invention consists of the construction, combination and arrangement of parts hereinafter fully described and claimed, and illustrated in the accompanying drawing, wherein:

Figure 1:
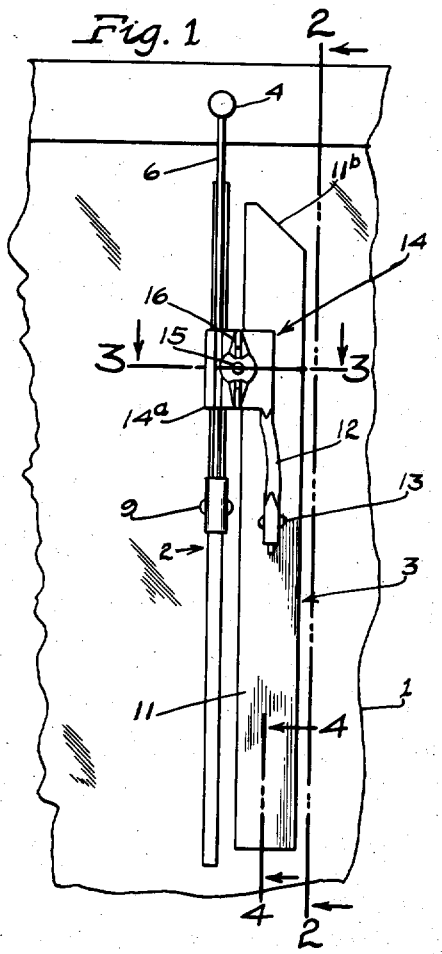
Figure 1 is an elevational view illustrating the application of the soluble material applying apparatus.
Figure 2:
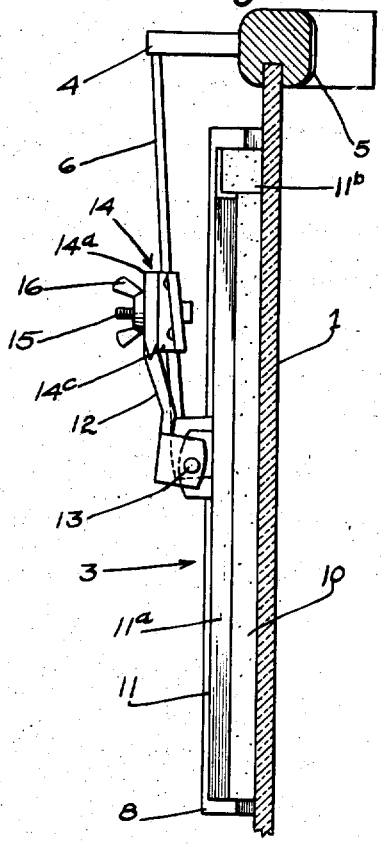
Figure 2 is a sectional view taken on the vertical plane indicated by the line 2—2 of Figure 1.
Figure 3:
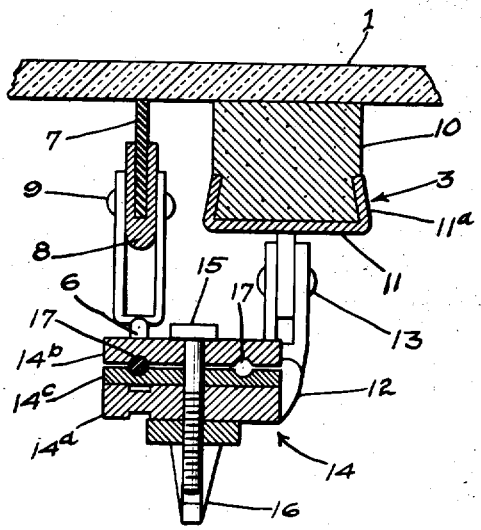
Figure 3 is a sectional view taken on the horizontal plane indicated by the line 3—3 of Figure 1.
Figure 4:
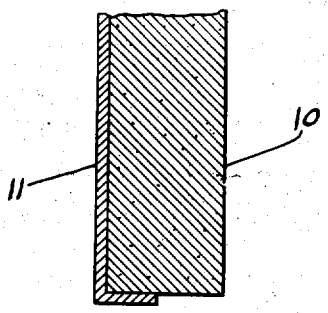
Figure 4 is a similar view taken on the vertical plane indicated by the line 4—4 of Figure 1.

Referring to the drawing by reference characters, 1 designates the windshield of an automobile, 2 the wiper for the windshield and 3 the apparatus for applying a material, which is soluble in the presence of snow and ice and which will melt the same to the outer surface of the windshield. The wiper 2, which may be of any well known or appropriate construction and of the manually or motor operated type, comprises a shaft 4 which is journaled in a frame 5 of the windshield 1, a wiper arm 6 which is secured to the shaft 4, and a rubber strip 7 which is secured in a holder 8 pivoted as at 9 to the arm.

The soluble material is in bar form. This bar 10 is preferably though not necessarily made of rock salt and is substantially similar in length to that of the wiper strip 7. The bar 10 is carried by a holder 11 which is open at its rear side and upper end and of which the lateral sides $11^a$ are inwardly inclined to securely retain the bar 10 therein. The holder 11 is secured to the arm 6 in a manner to position the bar 10 in parallel or substantially parallel relation to the wiper strip 7. This connection is established through the medium of an arm 12 pivoted as at 13 to the holder 11, and a clamp 14 carried by said arm and detachably engaged with the wiper arm 6. The clamp 14 is carried by the upper end of the arm 12, and the lower end of the arm is pivoted to the holder 11. The clamp 14 comprises a member $14^a$ fixed to and extending laterally from the arm 12, a member $14^b$ connected to the member 14 by a bolt 15 and winged nut 16, and a member $14^c$ is shown positioned upon the bolt 15 between the members $14^a$ and $14^b$. The clamp members $14^a$, $14^b$ and $14^c$ are provided with grooves 17 of different depths so as to adapt the apparatus for application to wiper arms of different diameter and of different cross sectional formation. When found necessary or desirable, the clamp member $14^b$ or the clamp member $14^c$ may be omitted. The upper end of the holder 11 is beveled as shown at $11^b$ so as to prevent its contacting with the windshield frame 5 when the apparatus is in operation.

From the foregoing and accompanying drawing, it will be apparent that the apparatus 3 is mounted on the windshield 1 in a manner to permit it to be operated manually or through the medium of a motor and that the apparatus will, when in operation, apply the soluble material to that portion of the windshield directly in front of the driver. The soluble material will prevent the formation of ice on such portion of the windshield and will melt snow falling on the windshield. Furthermore, the apparatus will, as it is connected to the wiper, apply the soluble material during the operation of the wiper, and the wiper will clear the stated portion of the windshield of melting snow or ice.

It will be further apparent that the apparatus is simple and durable, that it may be manufactured and sold at a comparatively low cost, and that it may be readily secured to and will not interfere with the operation of the wiper.

It should be understood that the drawing is merely illustrative and does not pretend to give exact proportions. Furthermore, the said drawing is illustrative of a preferred construction, it being my expectation that various changes and modifications may be made without departing from the spirit and scope of my invention.

I claim as my invention:

1. An attachment for the wiper arm of a windshield cleaner, comprising a holder for a soluble body adapted to be arranged parallel to the wiper arm and in contact with the glass, and means for pivotally connecting the holder to the wiper arm.

2. An attachment for the wiper arm of a windshield cleaner, comprising a holder for a soluble body adapted to be arranged parallel to the wiper arm and in contact with the glass, an arm pivotally connected to the holder, and a clamp carried by said second arm and engaging the wiper arm.

3. An attachment for the wiper arm of a windshield cleaner, comprising a holder for a soluble body, an arm pivoted to the holder, and a clamp carried by said second arm and engaging the wiper arm, said clamp including members provided with grooves of different depths for selective reception of the wiper arm, and a bolt for clamping said members to the wiper arm.

4. An attachment for the wiper arm of a windshield cleaner, comprising a bar of salt, a holder for the bar of salt, and means for supporting the holder from the wiper arm to position the bar of salt in contact with the glass of the windshield and in substantially parallel relation to the wiper arm of the cleaner.

5. An attachment for the wiper arm of a windshield cleaner, comprising a soluble body substantially similar in length to the wiper strip of the cleaner, a holder for the soluble body, and means for supporting the holder from the wiper arm to position the soluble body in contact with the glass of the windshield and in substantially parallel relation to the wiper arm.

6. An attachment for a windshield cleaner, comprising a non-flexible soluble body, and means for supporting said soluble body upon the windshield cleaner so as to cause said body to contact with the glass of the windshield, and to move with said cleaner.

7. An attachment for a windshield cleaner, comprising a non-flexible soluble body, a holder for said body, and means for supporting the holder upon the windshield cleaner to position said soluble body in contact with the glass of the windshield and to move with said cleaner.

8. An attachment for a windshield cleaner, comprising a bar of soluble material, a holder for said bar, and means for supporting the holder upon the windshield cleaner to position said bar in contact with the glass of the windshield and to move with said cleaner.

9. An attachment for a windshield cleaner, comprising an elongated bar of soluble material, a holder of U-shaped cross-section, adapted to receive said bar, and means for supporting said holder upon the windshield cleaner so that one side of said bar will contact with the glass of the windshield, and to move with said cleaner.

10. An attachment for a windshield cleaner, comprising an elongated bar of salt, a holder adapted to receive said bar, said holder having opposed side walls bent inwardly and one end wall cooperating with said side walls to retain said bar of salt in said holder, and means for supporting the holder upon the windshield cleaner to position said bar of salt in contact with the glass of the windshield.

In witness whereof, I have hereunto set my hand this 17th day of September, 1928.

CHRISTIAN H. STEDTFELD.